Oct. 6, 1942.  A. L. HOLVEN ET AL  2,297,764
PREPARED FONDANT SUGAR AND FUDGE MIXTURE
Filed Oct. 17, 1939

Inventors
Alfred L. Holven
William R. Junk
By W. K. Atkinson
Attorney

Patented Oct. 6, 1942

2,297,764

UNITED STATES PATENT OFFICE 2,297,764

PREPARED FONDANT SUGAR AND FUDGE MIXTURE

Alfred L. Holven and William R. Junk, Crockett, Calif.

Application October 17, 1939, Serial No. 299,824

11 Claims. (Cl. 99—134)

This invention relates to a carbohydrate material of microscopic fineness and the preparation of same for use in the manufacture of confectionery products.

One object of this invention is the production of a carbohydrate material composed of particles ground to such a degree of fineness that it may be used directly in the manufacture of confectionery products such as fondants, fudges, and icings, without the intermediate steps of cooking, cooling and agitating normally required.

Another object of this invention is the production of a dry fondant base consisting of colloidal size particles of sucrose which may be used alone to give a fine textured fondant or fudge, without the use of ingredients such as invert sugar normally required for obtaining fine crystallization in the case of fondant bases prepared in the usual manner.

A further object of this invention is the production of an ultra-fine particled material which may be used either directly or with other ingredients to produce mixtures that may be used in making fudge candy, icings and the like without the necessity of undergoing the preboiling steps normally associated with such processes and products.

Other objects and advantages of this invention will be in part evident to those skilled in the art and in part pointed out hereinafter as the description proceeds.

In order to more clearly indicate the nature and scope of this invention, a brief review of the prior art may be of assistance. Heretofore, in the production of confectionery products, such as fondants and certain icings, it has been necessary, in order to obtain the desired smooth texture and fine grain, to follow an elaborate and carefully controlled method of preparation. This method, in general, involves the boiling of proper amounts of sucrose and dextrose or invert sugars in solution at a predetermined temperature, carefully cooling to a critical temperature, and then agitating the mass vigorously to secure a fine-grained, tasty product.

As an illustration of the involved nature of this procedure, the following example of one method of preparation is given, although the details may obviously be varied as required:

1. Mix approximately 80 parts sucrose and 20 parts liquid glucose or invert syrup with sufficient water to dissolve.
2. Boil to exactly 240° F.
3. Cool to 90° F. This must be done quickly to prevent crystallization at this stage. This is one of the most important steps, as such variables as the relative humidity of the surrounding air and the room temperature have a pronounced effect on the temperature control and consequently on the quality of the final product.
4. Beat vigorously to cream. This is also very important as the smoothness and grainless character of the product is greatly influenced by the extent and vigorousness of beating. Insufficient and improper beating at this stage will result in a gritty-like fondant.
5. When completely creamed and of firm consistency, set aside to mature for twelve to twenty-four hours.

Material prepared in this manner is known as a fondant base or stock fondant. This stock fondant is usually used directly for making candy or icings, as the case may be, by heating to 120°–150° F., mixing well, and adding coloring and flavoring matter. In some cases the stock fondant may be stored in sealed containers for future use, but due to its uncertain keeping qualities, great care must be exercised not to keep it too long.

This general procedure has been in use for many years, both in the commercial and home production of fondants, fudges, and certain types of icings. However, as may be noted, the method is complicated and requires painstaking control in order to secure a uniformly textured product. As a result, much variation occurs from batch to batch in the texture and grain of the final product. In addition to these objections, the process is time-consuming and requires elaborate equipment and considerable manual labor.

While a dry fondant base composed of sucrose and a crystallization inhibitor, such as invert sugar, has been previously prepared by others, the production of this material first requires the preparation of a fondant which, as outlined hereinbefore, involves the precooking, cooling and agitating steps and finally the reduction of this stock fondant to a dry powder by pulverization and dehydration.

By the present invention, as distinguished from the above, it has been discovered that a product having all of the desirable characteristics of a regular fondant can be prepared with a considerable saving of time and energy in the production of confectionery products, and which exhibits all of the properties of a dry fondant base without its associated disadvantages, from granulated sugar mechanically ground and classified to colloidal size comparable to the grain size obtained by a proper crystallzation with the precooking, cooling and agitating method described above and as now practiced in the making of fondants. For example, with this new material a good fondant can be produced without the necessity for the steps of precooking, cooling and agitating normally associated with the production of fondants. A further advantage is that due to the uniformity of particle size obtainable in this manner, a reproducible base product having a much more uniform nature and smoother texture is obtained with the result that each subsequent batch of fondant made from said material will evidence the same desirable qualities. The advantages of such a material to the bakery and confectionery trade are obvious, as the use of the material has far greater flexibility than the fondant type mixtures produced in the manner taught by the prior art.

The present invention is predicated upon the discovery that a product having the same essential characteristics and properties of the finely crystallized material of precooked fondant bases, cooked fudges and the like, can be obtained by a controlled process of pulverizing and classifying to a degree of fineness heretofore never attempted for this purpose and in which the fineness of the material is controlled between approximately 5 and 25 microns in grain size. This results in an amorphous perfectly homogeneous material which is neither coarse enough to cause grittiness, nor so fine that fluffiness and dustiness occurs. Furthermore, the product produced in accordance with this invention exhibits all of the desirable properties of the aforementioned types of prepared fondants and eliminates the necessity for following the involved and elaborate steps employed in the past in the preparation of such mixtures.

The use of the product contemplated by the present invention involves simply a mixing with the proper amount of water and, if desired, some invert sugar or commercial glucose to produce an excellent fondant. For the production of a superior cold icing, the mixing of this product with the proper amount of water or cream will provide a satisfactory icing which is superior to the regular powdered sugar types of icing which are generally characterized by an absence of smoothness and fine-grained texture.

For the purpose of illustrating how the carbohydrate material contemplated by the present invention physically compares with the other materials hereinbefore referred to, the accompanying drawing shows three microphotographs of the different products with a magnification of 120 diameters.

Figure 1:
Figure 1 is a microphotograph of ordinary powdered sugar.
Figure 2:
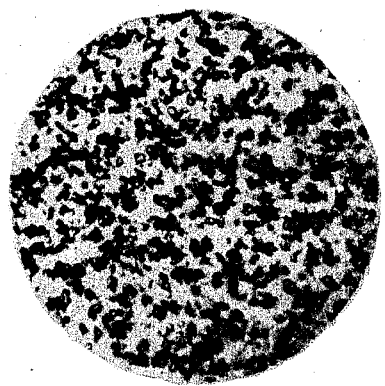
Figure 2 shows a sample of the extremely fine-grained sugar material which is produced by the precooking, cooling and agitating process employed in the preparation of fondants.
Figure 3:
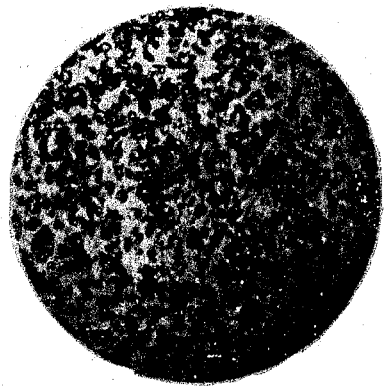
Figure 3 is a microphotographic view showing the material as prepared in accordance with the present disclosure.

Upon reference to Figure 1 of the drawing, it will be noted that the particles there illustrated are irregular in size and are much larger than those shown in the remaining figures of the drawing. It will also be noted, upon referring to Figure 2, that the grain size here illustrated is quite uniform and much smaller in comparison than that shown in Figure 1, while in Figure 3, it will be observed that the material produced by the present method compares favorably in grain size with that secured by the precooking, cooling and agitating method used in the preparation of fondants, as illustrated in Figure 2.

While we have described in considerable detail the development of our new product which greatly simplifies the production of a fondant, it has also been discovered that this new product can be combined with other dry ingredients to provide a new type of dry mixture for use in the manufacture of candy. These dry candy mixtures may be made directly into fudges and the like simply by mixing with a small amount of water. Heretofore, in the preparation of fudges of the precooked type, it has been necessary to follow the same elaborate and controlled procedure as that employed in the preparation of precooked fondants. This includes the careful cooking, cooling and beating steps previously described. However, by the use of our newly discovered product, all of these disadvantages are overcome, and an excellent fudge, having all of the characteristics of a precooked fudge, may be prepared in a much simpler manner than heretofore possible. No expensive equipment is required and since manual labor is reduced to a minimum, it is considered that the present invention will find ready acceptance on the part of both housewives and commercial establishments.

An example of the average composition of a dry fudge mixture which is prepared in accordance with this invention is as follows:

|  | Per cent |
|---|---|
| Ultra-fine sucrose | 88 to 95 |
| Dry ground cocoa | 8 to 3 |
| Dried milk | 3.8 to 1.8 |
| Salt | 0.02 to 0.02 |

By merely mixing these dry ingredients with water and, if desired, a suitable flavoring agent, a fudge equivalent in texture and smoothness to any precooked fudge will be obtained.

It should be understood that variations in the composition of this mixture are almost unlimited. For example, dry ground chocolate may be substituted for cocoa; dried milk may be entirely omitted, if desired; numerous types of flavoring agents, such as vanilla, may be employed; or any combination of these ingredients may be used. Furthermore, such dry fudge mixtures may be prepared with the ultra-fine sucrose material alone or with the sucrose material combined with a caking inhibitor and also with dry dextrose or invert, as previously mentioned.

As a further variation in the preparation of such dry mixtures, it should be pointed out that the extremely fine grain material, as disclosed in this invention, may be mixed together with other ingredients in the dry form as a dry fudge mix, or the ingredients may be mixed prior to the fine pulverization and all ground together.

In addition to the above disclosed new material itself, it has also been discovered that by the addition of certain other substances to this new material, a finished product, having improved setting characteristics and more surface luster or gloss, may be obtained. One such substance which is particularly effective from this standpoint is a modified form of dextrose, i. e., beta-dextrose anhydride which is more effective than either alpha dextrose hydrate or anhydride.

In preparing such mixtures, the original sugar from which the ultra-fine material disclosed in this application is prepared, is mixed with approximately 10% anhydrous beta-dextrose and the mixture ground to the extreme fineness characteristic of fondants. The use of anhydrous beta-dextrose parallels the more common use of invert syrup in cooked frostings and icings. However, the fact that beta-dextrose anhydride may be obtained commercially in a dry form enables the production of a dry fondant base having all the advantages of the material described earlier in this specification, but with additional advantage of improved setting qualities and luster.

In the preparation of fondants intended for many purposes, it has long been recognized that it is desired to have incorporated therein monosaccharides, or sugars of the general formula $C_6H_{12}O_6$ rather than having the fondant consist solely of disaccharides-sucrose of the formula $C_{12}H_{22}O_{11}$. In methods of fondant preparation which have been in vogue heretofore, such monosaccharides have been introduced in the form of either glucose or as invert sugar. Invert sugar, as used in this terminology, consists of equal molecular proportions of dextrose and levulose. The addition of such monosaccharides serves the twofold purpose of retarding the crystallization in the final fondant, thereby preventing sandiness, grittiness, etc., and also serves to impart a better gloss or luster in icings and frostings made therefrom.

Until the present invention, there has been no method of successfully producing a completely anhydrous fondant embodying the requisite proportions of such monosaccharides. The nearest approach to such a product has consisted of a product comprised largely of sucrose to which there has been added a small amount of invert sugar. This, however, has not produced the desired result because it has been impossible to successfully handle this product owing to the highly hygroscopic character of the levulose component of the invert syrup contained therein. For such reasons, products heretofore employed have contained at least 1½ to 2% or more of moisture. Presence of such moisture and the hygroscopic character of the levulose contained therein, have served to cause products of such composition to cake or set so readily owing to transition of the moisture component from its role as a solvent for sucrose, that the product has often been unusable. Neither has it been possible to attain the desired result by means of the addition of ordinary corn sugar or ordinary dextrose, as such dextrose does not have the required solubility inasmuch as dextrose ordinarily dissolves to the extent of only approximately 52%. For such reasons it has been impossible to prepare an anhydrous fondant of the desired composition prior to the present invention. It is, therefore, a particularly novel feature of the present invention to provide a product having the desired proportion of monosaccharides, that is, sugars of the general formula $C_6H_{12}O_6$ incorporated in the anhydrous fondant and satisfactorily redispersed in the subsequently moistened fondant with all of the advantages ordinarily attendant on the use of such monosaccharides, and in which the monosaccharides are introduced in the form of beta-dextrose. Ordinary corn sugar or ordinary dextrose or alpha dextrose is unsuitable because of its limited solubility. In accordance with the novel discovery of this invention the monosaccharide is introduced in the form of beta-dextrose which has a solubility of 69% as distinguished from a solubility of 52% for ordinary dextrose. It is, therefore, possible to introduce a sufficient amount of this product into the moistened fondant paste or icing and attain the results which cannot be obtained by either corn sugar or ordinary dextrose. Subsequently, the beta-dextrose so introduced reverts to the form of alpha dextrose after being moistened and thereby brings about all of the advantages ordinarily attendant upon the use of such products.

The use of beta-dextrose, as described above, results in a product having no invert sugar and consequently no levulose, and as a result a completely anhydrous mixture which avoids all of the difficulties inevitably associated with the inclusion of levulose is provided. At the same time the product has all of the desirable characteristics attendant upon the use of invert sugar, etc., as disclosed by the prior art; as for example, gloss, luster, smooth texture and final consistency.

We have found that the particular modification of dextrose known as beta-dextrose provides a dextrose somewhat different in molecular structure than that of ordinary dextrose and one which has a very much greater degree of solubility than ordinary dextrose. This beta-dextrose is sufficiently soluble so that seven parts thereof will dissolve in three parts of water, whereas ordinary dextrose is soluble only to the extent of about one part of dextrose in one part of water. From this it is evident that beta-dextrose has a solubility of somewhat over twice as much as that of ordinary dextrose. This particular advantage from the standpoint of its application to fondant preparations is indicated by the thought that when it is incorporated therewith, after being ground to a suitable degree of subdivision or fineness, it will readily dissolve to secure the desired degree of saturation of the syrup prior to the time that it chemically reverts to the form of ordinary dextrose. Upon reversion to the form of ordinary hydrated dextrose, it absorbs or takes into chemical combination some of the water which has been added to make up the fondant or icing pastes and thereby facilitates the setting of the product.

It is recognized that in the past there have been many developments of a similar nature and that certain types of materials, mixtures and recipes have been evolved in the natural course of development. However, in the past, where such mixtures have been proposed, the components have been brought into solution and then subjected to a process of "pre-graining" or recrystallization. We, on the other hand, obtain the desired particle size of substantially colloidal dimensions entirely by mechanical means. In this latter connection, it should be borne in mind that the physical chemistry involved with particles of such infinitesimally small or colloidal size, as here disclosed, is very different from that involved with particles of more finite size, as it results in a substantially immediate saturation of the water when subsequently added for the preparation of icings and fondants, a result which cannot be achieved with materials of larger particle size.

By our improvement we are able to produce a completely anhydrous product that characteristically differs from any other fondant or fudge mixture that has heretofore been manufactured and one which can be manufactured entirely by mechanical means without having at any stage of its manufacture been brought into solution.

Therefore, since no one, so far as the applicants are aware, has ever recognized the fact that by a pre-controlled pulverization and a utilization of this ultra-fine material in the manner described, a product which is equal to or superior in quality to the products made by the prior art methods could be produced without the necessity of preboiling, cooling and beating, it is considered that the applicants have made a discovery which represents a definite advance in the art.

In further reference to the anhydrous characteristics of our product, a somewhat analogous situation exists in respect to the use of fully dehydrated or anhydrous milk solids. When incorporated in our fondant mixture and dispersed therein, the anhydrous lactose content in these milk solids likewise chemically takes up water of crystallization to form lactose hydrate, thereby further reducing the free moisture content of the icing or fondant pastes, further facilitating setting. By such means we secure as the ultimate product, one which will more readily set than that obtained by other conventional means.

As a further modification of this disclosure, it is pointed out that the use of an anti-caking agent, such as starch or tricalcium-phosphate, may be employed where large quantities of this fine-grained material are to be stored for long periods of time. This merely offers protection from the caking of the fine-grained material and is optional, having no particular bearing on the disclosure herein made. The quantity of starch normally required is approximately 3% to 6%.

While we have in the preceding description discussed the preparation of fondants and fudges in considerable detail, it is to be understood that the invention is not limited to the specific examples given above, but may be embodied in other ways that will suggest themselves to persons skilled in the art. It is believed that this invention is new and it is desired to claim it so that all such changes as come within the scope of the appended claims are to be considered as part of this invention.

Having thus described our invention, what we claim and desire to secure by Letters Patent is:

1. An uncooked fondant producing carbohydrate, including sucrose and anhydrous beta-dextrose, characterized by a grain of microscopic size ranging from 5 to 25 microns.

2. A new uncooked fondant product comprising a dry mixture of 90% finely pulverized sucrose mechanically prepared to a controlled microscopic fineness ranging approximately from 5 to 25 microns, together with 10% beta-dextrose anhydride which with the admixture of water will constitute a creamy product without the necessity of precooking, cooling and vigorous agitating.

3. The process of preparing an anhydrous fudge mixture which comprises mixing sucrose, anhydrous beta-dextrose, dry ground cocoa, dehydrated milk and flavoring and mechanically reducing said mixture to a colloidal grain size of from 5 to 25 microns.

4. A fine grained anhydrous sucrose material, including approximately 10% anhydrous beta-dextrose, characterized by a grain of microscopic size ranging substantially from 5 to 25 microns.

5. A new uncooked candy producing product consisting of a dry mixture of sucrose and anhydrous beta-dextrose, dry ground cocoa, dried milk and flavoring having a microscopic fineness ranging from 5 to 25 microns in grain size.

6. The process of preparing an uncooked fondant mixture which comprises grinding and classifying a dry sucrose material and anhydrous beta-dextrose to a microscopic grain substantially all of which is from 5 to 25 microns in size.

7. As an article of commerce, a fondant sugar, comprising crystallized sucrose and a caking inhibitor mechanically reduced to an amorphous state and characterized by a grain of microscopic size ranging substantially from 5 to 25 microns.

8. A new candy product, comprising an anhydrous mixture of sucrose sugar reduced to an amorphous state and having a fineness of grain ranging from 5 to 25 microns in size, together with dry ground cocoa, dry milk powder, salt and flavoring, characterized by the fact that with the admixture of water it will constitute a creamy fudge preparation without precooking, cooling and vigorous agitating.

9. An anhydrous sucrose material for uncooked fondants and the like, comprising granulated sucrose sugar mechanically reduced to an amorphous state and characterized by a grain size ranging between 5 and 25 microns and which upon admixture with water will produce a smooth creamy fondant or icing without precooking, cooling and beating.

10. A dry sucrose material for producing uncooked fondants and the like, comprising a crystalline sucrose sugar mechanically ground and classified to an amorphous condition and having a grain size not in excess of 25 microns, whereby upon the addition of water and gentle stirring it will provide a smooth textured grainless product without the necessity of precooking, cooling and vigorous agitating as practiced in the production of cooked fondants.

11. A dry sucrose sugar material for producing uncooked fondants and the like, comprising a crystalline sucrose sugar mechanically reduced to an amorphous state and having a grain size corresponding to that produced by preboiling, cooling and agitating as practiced in the production of cooked fondants.

ALFRED L. HOLVEN.
WILLIAM R. JUNK.